US012707548B2

(12) United States Patent
Li et al.

(10) Patent No.: US 12,707,548 B2
(45) Date of Patent: Aug. 11, 2026

(54) METHOD AND SYSTEM FOR DESIGNING HUMAN-CENTRIC LIGHTING

(71) Applicant: LEDVANCE GmbH, Garching bei München (DE)

(72) Inventors: Heng Li, Shenzhen (CN); Shaokun Chen, Shenzhen (CN)

(73) Assignee: LEDVANCE GmbH, Garching bei München (DE)

( * ) Notice: Subject to any disclaimer, the term of this patent is extended or adjusted under 35 U.S.C. 154(b) by 48 days.

(21) Appl. No.: 18/799,132

(22) Filed: Aug. 9, 2024

(65) Prior Publication Data

US 2025/0063646 A1 Feb. 20, 2025

(30) Foreign Application Priority Data

Aug. 16, 2023 (CN) ......................... 202311036987.8

(51) Int. Cl.

| | |
|---|---|
| ***H05B 47/165*** | (2020.01) |
| ***G06F 30/27*** | (2020.01) |
| ***H05B 47/175*** | (2020.01) |
| *G06F 16/28* | (2019.01) |
| *G06F 111/02* | (2020.01) |

(52) U.S. Cl.

CPC ........... *H05B 47/165* (2020.01); *G06F 30/27* (2020.01); *H05B 47/1985* (2024.01); *G06F 16/284* (2019.01); *G06F 2111/02* (2020.01)

(58) Field of Classification Search

CPC ... H05B 47/165; H05B 47/1985; G06F 30/27; G06F 16/284; G06F 2111/02

See application file for complete search history.

(56) References Cited

U.S. PATENT DOCUMENTS

2022/0027532 A1* 1/2022 Zhang ..................... G06F 30/20

* cited by examiner

*Primary Examiner* — Henry Luong
(74) *Attorney, Agent, or Firm* — Hayes Soloway PC

(57) ABSTRACT

A method for designing human-centric lighting (HCL) for illuminating a space is provided. The method includes: providing use-related information to a floor plan of the space; performing a search in a database of historical lighting solutions based on the floor plan to find a lighting solution matching the space; extracting a layout method from the lighting solution matching the space; performing a search in a lighting device database; selecting a lighting device available for the space and layout from the lighting devices; simulating an installation of the lighting device into the space based on the layout; calculating lighting data; performing a search in a lighting standard database; checking whether the calculated lighting data meets an applicable lighting standard; and generating an HCL lighting plan if a result of the checking shows a conformity of the calculated lighting data to the applicable lighting standard.

15 Claims, 9 Drawing Sheets

| common illuminants or light sources | $k_{mel,r}$ (Age of 25) | $k_{mel,r}$ (Age of 32) | $k_{mel,r}$ (Age of 50) | $k_{mel,r}$ (Age of 75) | $k_{mel,r}$ (Age of 90) |
|---|---|---|---|---|---|
| equi-energy spectrum | 1,052 | 1,000 | 0,835 | 0,589 | 0,459 |
| CIE standard illuminants | 1,042 | 1,000 | 0,863 | 0,646 | 0,523 |
| Fluorescence 3000K (CIE illuminants FL 12, inserted to 1nm) | 1,045 | 1,000 | 0,857 | 0,641 | 0,524 |
| Fluorescence 4000K (CIE illuminants FL 11, inserted to 1nm) | 1,050 | 1,000 | 0,842 | 0,608 | 0,484 |
| CIE illuminants D65 (daylight 5500K) | 1,050 | 1,000 | 0,840 | 0,598 | 0,468 |
| CIE standard illuminants D65 (daylight 6500K) | 1,052 | 1,000 | 0,835 | 0,589 | 0,457 |

Fig. 1

| common illuminants or light sources | illuminance $E_v$ (lx) | Melanopic illuminance $E_{mel}$ (mW·m$^{-2}$) | mEDI(D65) $E_{v,mel}^{D65}$ (lx) | Melanopic Efficacy of optical radiation (of light sources) $K_{mel,v}$ (mW·lm$^{-1}$) | Melanopic Daylight Efficacy Ratio (D65) $\gamma_{mel,v}^{D65}$ |
|---|---|---|---|---|---|
| equi-energy spectrum | 100 | 120,1 | 90,6 | 1,201 | 0,906 |
| CIE standard illuminants | 100 | 65,7 | 49,6 | 0,657 | 0,496 |
| Fluorescence 3000K (CIE illuminants FL 12, inserted to 1nm) | 100 | 53,4 | 40,4 | 0,534 | 0,404 |
| Fluorescence 4000K (CIE illuminants FL 11, inserted to 1nm) | 100 | 74,5 | 56,2 | 0,745 | 0,562 |
| CIE illuminants D65 (daylight 5500K) | 100 | 119,9 | 90,4 | 1,199 | 0,904 |
| CIE standard illuminants D65 (daylight 6500K) | 100 | 132,6 | 100,0 | 1,326 | 1,000 |

Fig. 2

| objects to be calculated | vertical Illumination of eyes（1.2m） （lux） | mEDI correction（lux） |
|---|---|---|
| 1 | 387 | 276.29 |
| 2 | 365 | 260.58 |
| 3 | 344 | 245.59 |
| 4 | 315 | 224.89 |
| 5 | 379 | 270.58 |
| 6 | 359 | 256.30 |
| 7 | 339 | 242.02 |
| 8 | 311 | 222.03 |
| Averaged 1.2m | 365 | 260.58 |

Fig. 4

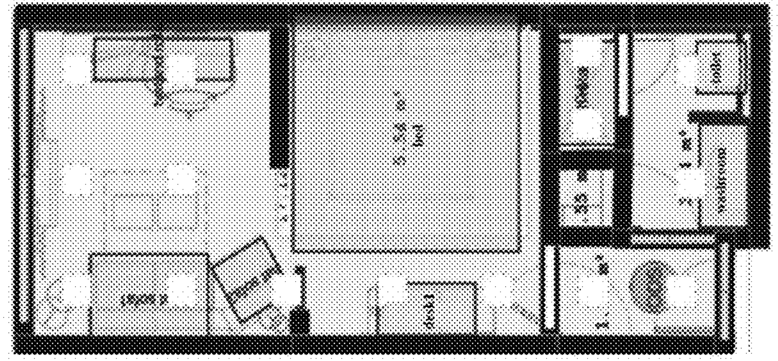
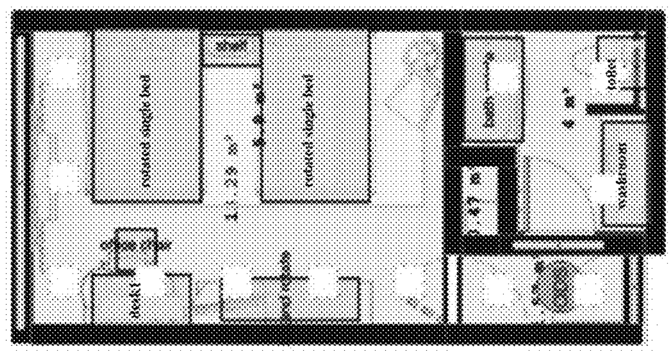
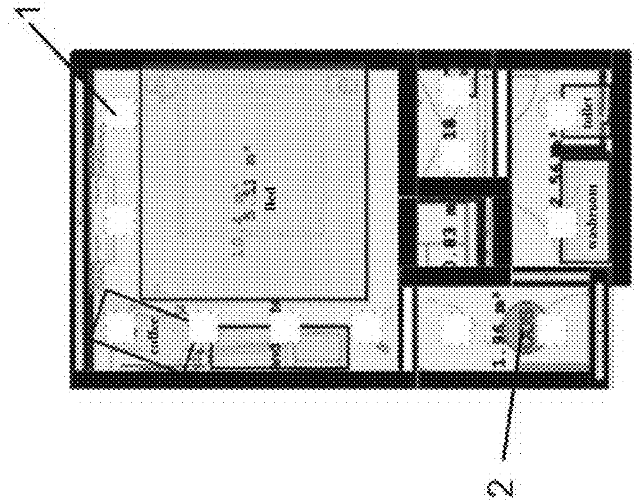
Fig. 5

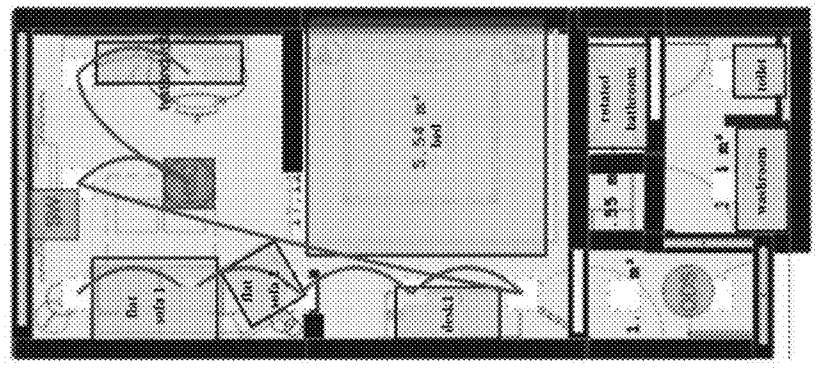
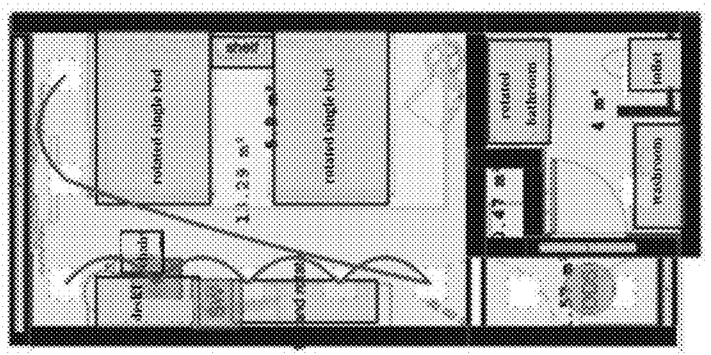
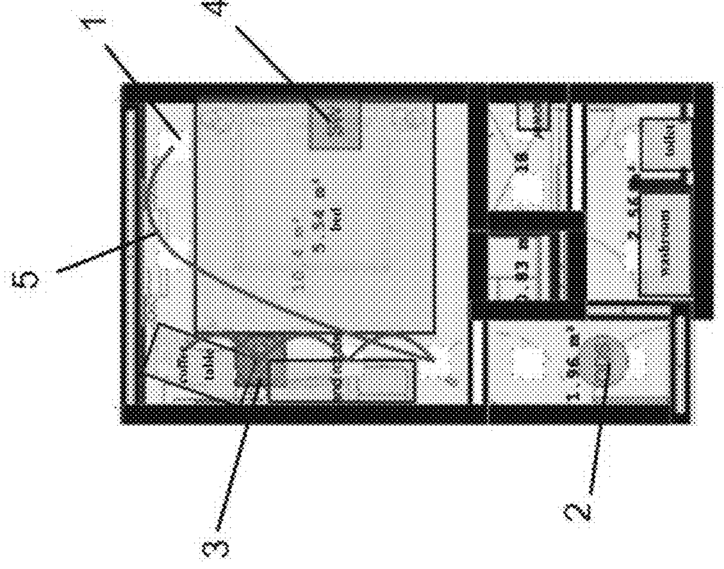
Fig. 6

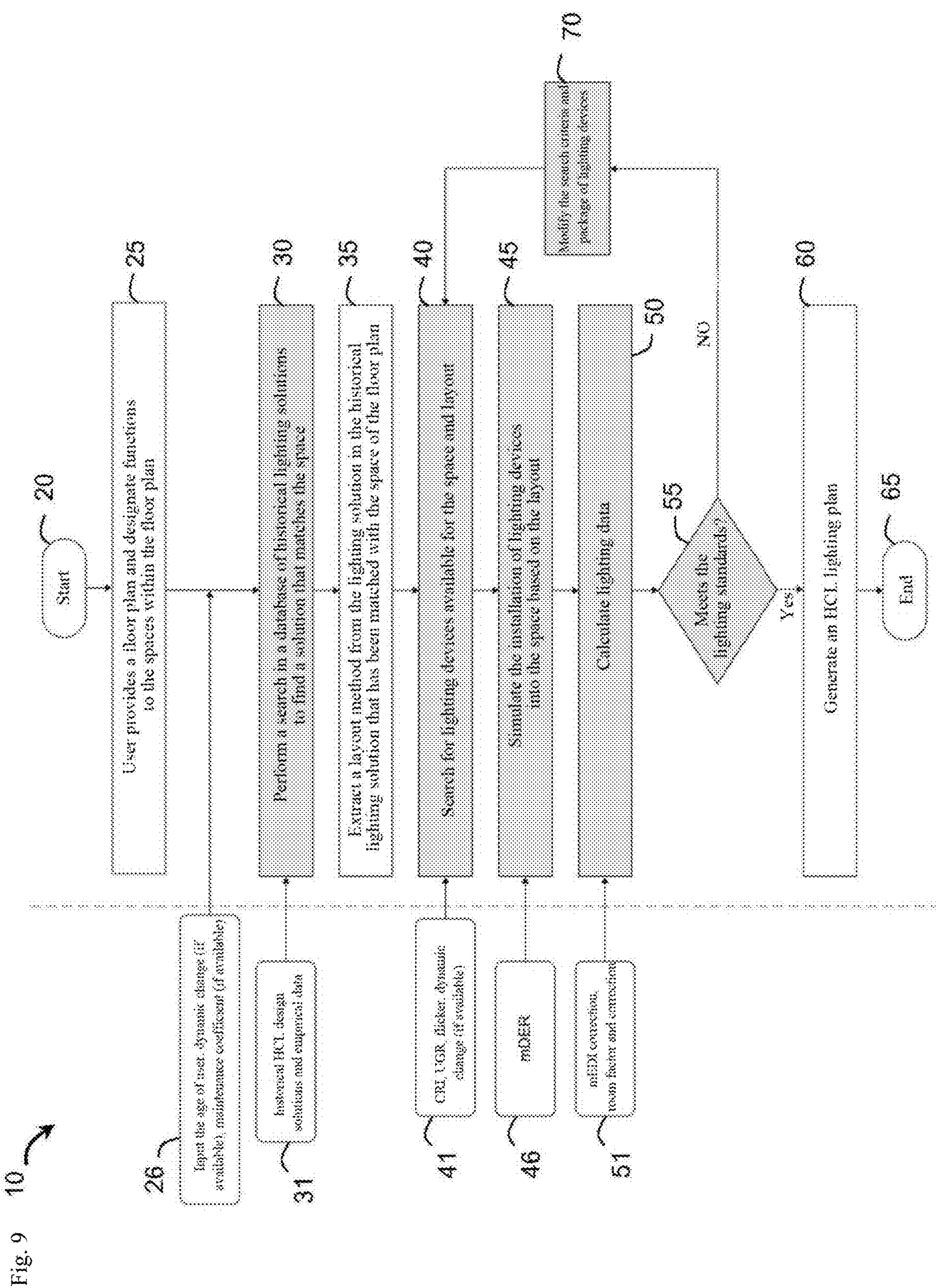
Fig. 9
10
Start
20
User provides a floor plan and designate functions to the spaces within the floor plan
25
Input the age of user, dynamic change (if available), maintenance coefficient (if available)
26
Perform a search in a database of historical lighting solutions to find a solution that matches the space
30
Historical HCL design solutions and empirical data
31
Extract a layout method from the lighting solution in the historical lighting solution that has been matched with the space of the floor plan
35
Search for lighting devices available for the space and layout
40
CRI, UGR, flicker, dynamic change (if available)
41
Simulate the installation of lighting devices into the space based on the layout
45
mDER
46
Calculate lighting data
50
mEDI correction, room factor and correction
51
Meets the lighting standards?
55
NO
Yes
Modify the search criteria and package of lighting devices
70
Generate an HCL lighting plan
60
End
65

METHOD AND SYSTEM FOR DESIGNING HUMAN-CENTRIC LIGHTING

CROSS-REFERENCE TO RELATED APPLICATIONS

This patent application claims the benefit of and priority to Chinese Patent Application No. 202311036987.8, filed on Aug. 16, 2023, which is herein incorporated by reference in its entirety.

FIELD OF THE DISCLOSURE

The technical field of the present application generally relates to lighting systems. In particular, the present disclosure relates to a method and system for designing human-centric lighting (HCL) for illuminating a space.

BACKGROUND

There are known human-centric lighting systems designed to provide lighting based on circadian rhythms, such as so-called melanopic equivalent daylight illumination (MEDI). In the known systems, many factors that may affect the circadian rhythm are not fully considered. Perhaps partly due to the complex dependence of circadian rhythms on many parameters, formal methods are often used, in which lighting design and light adjustment are mainly based on system characteristics (such as the light curve or control options of the system) and less based on the individual biological rhythm of the target applications or target groups. Another challenge for lighting designers is to meet HCL standards. Organizations such as the International Commission on Illumination (CIE), Underwriters Laboratories (UL), the International Well Building Institute (WELL), the European Committee for Standardization (CEN), and the German Institute for Standardization (DIN) have begun to quantify and evaluate design standards for HCL. Designers incorporate these standards into their designs, which requires consideration and calculation of several new parameters. Because of the repeatability of standards, even professional designers often lack time and energy to complete HCL designs, let alone semi-professional lighting professionals.

SUMMARY

The purpose of this application is to provide a method for designing standard-compatible human-centric lighting, which better considers the individual characteristics of a target applications and a target user group.

According to a first aspect, a method for designing human-centric lighting (HCL) for illuminating a space is provided. The method includes providing use-related information to a floor plan of a space. Generally, the space can be a functional space of any type, such as an office space, a living space, a production workshop, or a space with mixed functions. The floor plan and use-related information can be provided specifically through a user interface. The use-related information can specifically include use condition, use target and target physiological characteristics of a user group of a target group.

The method includes performing a search in a database of historical lighting solutions based on the floor plan to find a solution that matches the space, and extracting a layout method from the lighting solution that matches the space.

The method further includes looking up in a lighting device database, and selecting a lighting device available for the space and layout from the lighting devices. The lighting device or luminaires database may include substantially all luminaires that meet the original licensing standards of HCL.

Considering the beam angle and the type of space, selecting lighting devices may include selecting luminaires, controllers, and accessories that meet the HCL requirements of the current space.

The method further includes simulating the installation of lighting devices into the space based on the layout, and calculating lighting data. The installation of the simulated lighting devices may include generating a scene, particularly by means of a scene generation module, which generates a most suitable scene based on the current user conditions and physiological characteristics. Simulating the lighting of the lighting devices further includes modeling the lighting, specifically modeling the lighting by means of a modeling and output module.

The calculation of the lighting data can be performed in an HCL optical automatic calculation module. The calculation can include, but is not limited to, eye horizontal and angular illuminance calculation, desktop illuminance calculation, space illuminance calculation, glare calculation and glare direction calculation.

The method further includes searching for a lighting standard database or an HCL optical standard database, which includes but is not limited to eye horizontal and angular illuminance, desktop illuminance, wall surface reflection illuminance, glare value and glare direction.

The method further includes checking whether the calculated lighting data conforms to applicable lighting standards or specifications. The method further includes generating an HCL lighting plan when the result of checking shows that the calculated lighting data meets the applicable lighting standards.

Due to the use-related information provided along with the floor plan, the method allows comprehensive consideration of use-related information, such as use condition, use target and target physiological characteristics of a user group, to generate an HCL lighting solution.

Further, the HCL lighting plan or HCL design can be automatically generated, in which the use-related information is properly considered. Specifically, the beam angle and the type of the space are considered, the luminaires, controllers and accessories meeting the HCL requirements of the current space are automatically selected. In addition, the compliance of the calculated lighting data is checked before the HCL lighting plan is generated, so as to ensure that the generated lighting plan meets the applicable standards. Specifically, the method can ensure that the eye horizontal illumination is suitable for the physiological characteristics and location of a user group, and the HCL luminaires and lighting curve solution are suitable for the use condition of the user group. In addition, the user does not need to be familiar with all HCL measurements or repeatedly adjust the luminaires selection and the solution to meet the entire HCL solution. In addition, the whole process including providing luminaires, controller and a scene solution is automatically completed at one time.

The use-related information may include information about functions designated for the space within the floor plan. Based on the assigned function, the historical scheme suitable for the designated function can be specifically and effectively searched for in the database.

The use-related information may include target group related information. By considering the target group related information, HCL can be specifically customized for the target user group. Specifically, the target group related information may include the age of the user. Since age can have a substantial impact on the circadian rhythm of individuals, HCL can be better customized for the target group through considering the age of users. Therefore, personalized automatic HCL designs can be provided.

The method may further include modifying one or more search criteria and repeating the step of searching for lighting devices and all subsequent steps of the method. By means of the iterative adjustment of the search criteria, the chances of successfully finding suitable lighting devices can be increased.

The method may include providing dynamic change data and/or maintenance coefficient data, and performing a search in a database of historical lighting solutions based at least in part on the dynamic change data and/or the maintenance coefficient data. Therefore, the historical lighting solutions related to the dynamic change data and/or the maintenance coefficient data can be considered when generating an HCL lighting plan.

The database of historical lighting solutions can include historical HCL design solutions and empirical data. By searching in the historical database, it is possible to access a lot of knowledge and experience when searching for a suitable solution.

The method may further include providing data about color rendering index (CRI), uniform glare rating (UGR), flicker, and/or dynamic requirement changes, and may search for lighting devices based at least in part on the CRI, UGR, flicker, and dynamic requirement data. By means of providing data about additional lighting parameters, the search scope can be further narrowed, making it easier to find a suitable lighting solution.

The method may include providing melanopic daylight efficacy ratio (MDER) data and searching for lighting devices based at least in part on the MDER data. Specifically, the MDER data can be retrieved from the lighting standard database to ensure that the HCL standard for the MDER data is met.

According to a second aspect, a system for designing HCL for illuminating a space is provided. The system includes a server with a processor, a memory unit for storing machine-readable instructions for the processor, and an interface for receiving input data and instructions from a user. The input data includes a floor plan of the space with use-related information. The server may include more than one processor and more than one memory unit. The server can be at least partially implemented as a distributed cloud server.

The machine-readable instructions include commands to the processor to perform following operations: searching a database of historical lighting solutions based on the floor plan to find a solution that matches the space; and extracting a layout method from the lighting solution that matches the space. Further, the server is configured (i.e., the machine-readable instructions further include a command to the processor) to perform a search in the lighting device database for lighting devices available for the space and layout. The server is further configured to simulate the installation of the lighting devices into the space based on the layout, and calculate lighting data. The server is further configured to perform a search in the lighting standard database and check whether the calculated lighting data meets the applicable lighting standards. The server is further configured to generate an HCL lighting plan when the result of the checking shows that the calculated lighting data meets the applicable lighting standards.

Therefore, the system can automatically select luminaires according to the floor plan and the individual needs of the target group.

The lighting device database or library may specifically include stored data covering substantially all available lighting devices in each country and region. The database of lighting devices or luminaires can usually include information such as device type, device specification, lighting parameters, IES files, and size parameters such as height, width, aperture, etc. The lighting device database may further include device installation guides, specifically, which are used to generate the final installation guides in the report. The database can further include information about the applicable scope, such as luminous efficacy, HCL compatibility and scope of application (e.g., an open office, a meeting room, etc.). The system can use the information to evaluate whether the device is suitable for a given HCL space and solution.

The lighting standard database or HCL optical standard database may include but not limited to the following standards: eye horizontal illuminance, MDER, glare value, average lux level, maximum/minimum lux level, lateral lux level, uniformity, calibration factor of age/calibration factor of space. For quick availability, standards can be retrieved from the cloud database and stored as data tables in the memory unit of the server.

All automatically generated HCL solutions will be enforced to meet the mandatory standards of them, and will strive to meet the non-mandatory aspects as much as possible.

The system can include manual licensing and automatic licensing. Manual licensing may involve a selection of HCL devices manually entered by the designer's maintenance. Usually, those luminaires customized for specific HCL situations are given priorities during selection.

Automatic licensing selects luminaires from the current folder based on a wide HCL luminaire standard. The criteria for selecting include but are not limited to CRI (color rendering index) and lumen efficacy.

Attributes such as function, space, user age and user preference will be proceeded in another round of selection during the HCL selection process. This will produce a list of HCL luminaires candidates that best suit the current space and user preferences.

The system may include a scene generation module for generating a scene, a modeling and output module for simulating the installation of lighting devices, and an HCL optical automatic calculation module for calculating lighting data. The modules can be implemented in a server on a separate cloud-based server. By means of the dedicated modules, the system can be used and updated flexibly, and if necessary, it is possible to update only a relevant module instead of the whole system.

Specifically, when it is sufficient to satisfy the optical parameters, the scene generation module may be configured to provide only a solution of HCL luminaires. The scene generation module can further be configured to provide functions of generating control package and generating solution if a controller and a lighting curve adjustment are supported. Selecting lighting devices may include selecting the types of a controller and a sensor that best match the HCL luminaires.

The selecting of a controller can be based on preset types of luminaires and can be accomplished through a controller mapping. In the case that the controller can control multiple luminaires, the system can automatically divide the luminaires into groups and add data to the circuit accordingly. It is possible to perform the grouping by means of but not limited to K-means (specifically, a refined K-means method).

The scene generation module can further be configured to automatically generate a layout of sensors based on the shape and area of the current space to cover more than 90% of the range in the space.

After the groups are simply divided in the space, the system can provide the most basic HCL control curve. In particular, all luminaires can be controlled with a uniform lighting curve.

In addition to spatial relationships, the grouping of luminaires may further consider the spatial attributes of functions. For example, in a typical meeting room, a row of luminaires in front of a TV can be grouped separately from the rest of the lighting devices, such that more typical office scenes, such as meeting mode and rest mode, are generated. All these modes can be predefined in the strategy library and correspond to the HCL requirements. In other words, for simple requirements, the system will generate a default scene of the HCL lighting curve, meanwhile, the system is able to generate a mixed scene related to functions. Scenes can be predefined by professionals and stored in the strategy library of the scene generation module.

The HCL optical automatic calculation module may include a part for space layout of luminaires and a part for optical result calculation.

The space layout module places lighting devices based on the current space geometry, use attributes, functional division and the placement of key lighting devices. Lighting device placement is mainly based on a geometric placement method and a machine learning model. The geometric placement method can specifically include uniform distribution, binary placement and centerline placement.

The optical result calculation module is configured to calculate the standard parameters in the optical standard library and provide feedback on whether the mandatory standards are met. If the standards are not met, it will provide feedback to the spatial computing module, and based on the feedback, the solution will be adjusted and recalculated until all mandatory standards are met.

In the following description, details are provided to describe embodiments of the specification. However, it will be apparent to those skilled in the art that the embodiments may be practiced without such details.

Some parts of the embodiment have similar parts. Similar parts may have the same name or similar numerals. Where appropriate, the description of one part is applied to another similar part by reference, thus reducing the repetition of text without limiting the disclosure.

BRIEF DESCRIPTION OF THE DRAWINGS

FIG. 1 shows an exemplary table with aging correction factors for common light sources;

FIG. 2 shows an exemplary table with MDER values for common light sources;

FIG. 4 shows the vertical illuminance and MEDI correction of eyes according to the optical simulation of FIG. 3;

FIG. 5 shows a sample scenario in a simple case;

FIG. 6 shows a sample scenario in an advanced case;

FIG. 9 shows a flowchart of a method for designing HCL according to an embodiment.

DETAILED DESCRIPTION

FIG. 1 shows an exemplary table with aging correction factors for common light sources. Such data can be stored in a human-centric lighting (HCL) optical standard database and can be retrieved to check the consistency of the calculated lighting data with the standards. Common light sources are listed in the left column of the table, and age of user are indicated in the top row. As can be seen from the table, for all types of light sources, the age correction factor strongly depends on the age of user. Such table can be used as a lookup table to check the consistency of calculated lighting data with applicable standards.

FIG. 2 shows an exemplary table with melanopic daylight efficacy ratio (MDER) values for common light sources. Similar to FIG. 1, the left column contains a list of common light sources. In the top row, MDER parameters and corresponding units are indicated. Such table can be used as a lookup table to check the consistency of calculated lighting data with applicable standards.

Figure 3:
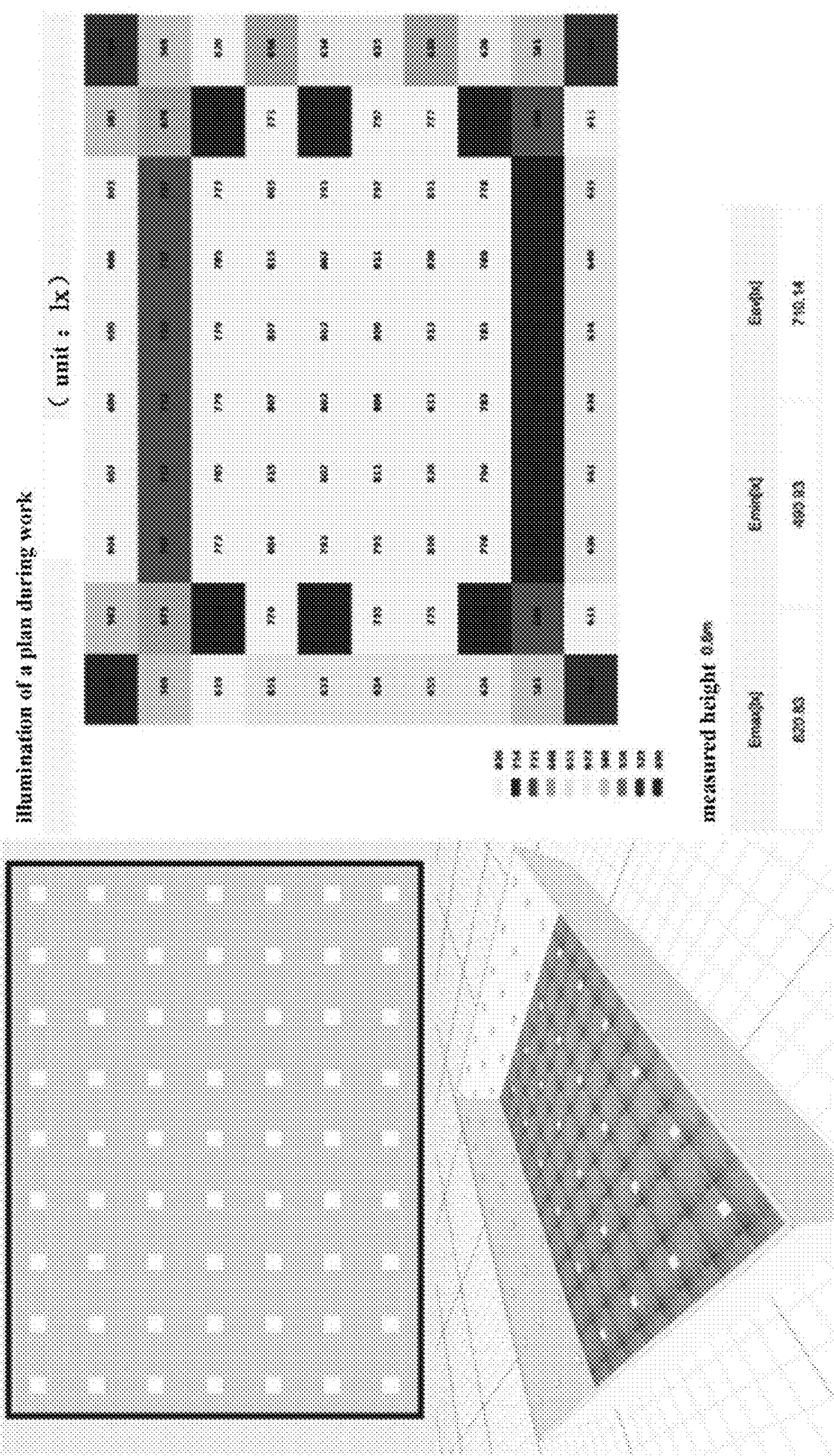
FIG. 3 shows an exemplary lighting layout plan and optical simulation results.

FIG. 3 shows an exemplary lighting layout plan and optical simulation results. The layout corresponds to a rectangular space with multiple distributed lighting devices. On the left side of FIG. 3, a top view and a perspective view of the space are shown. On the right side, the simulation results are shown. Specifically, the illumination distribution as indicated in the right side of the figure is obtained by simulation. At a measured height of 0.8 meter, the maximum illumination is 820.83 Lux in the central area of the space, and the minimum illumination is 490.93 Lux in the peripheral area or corner of the space.

FIG. 4 shows vertical illuminance and equivalent daylight illumination (EDI) correction of eyes according to the optical simulation of FIG. 3. Specifically, FIG. 4 shows a table, for different calculation objects at the eye level (at 1.2 meter), with values (in Lux) of vertical illuminance, MEDI correction values (in Lux) and average values.

FIG. 5 shows a sample scenario in a simple case. Specifically, FIG. 5 shows three examples of residential spaces with typical layouts. In the simple case, the lighting devices include luminaires 1 and an occupancy daylight sensor 2. In the simple case, a controller is not supported. Therefore, it is sufficient for a solution of HCL luminaires to meet the optical parameters.

FIG. 6 shows a sample scenario in an advanced case. Specifically, FIG. 6 shows an example of a living space in a connected situation similar to FIG. 5, which has controllers and sensors supporting scenes and light curves.

In the advanced case of FIG. 6, the lighting devices include a luminaire 1 and an occupancy daylight sensor 2. The lighting devices further include a controller 3 with a high bay sensor and a control switch 4. The luminaire 1, the control switch 4 and the controller 3 are functionally connected to form a network 5.

Figure 7:
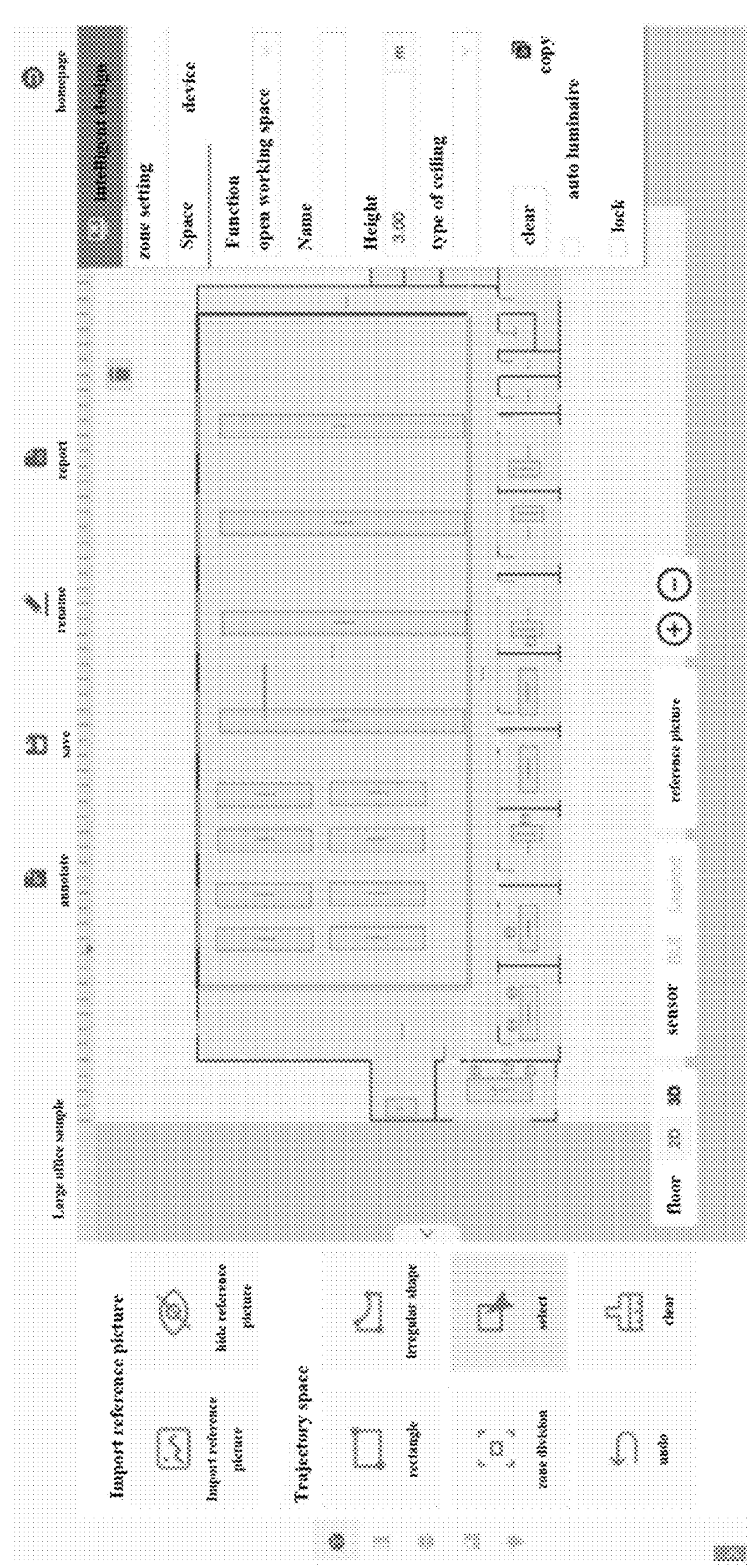
FIG. 7 shows a control interface of a system according to an embodiment.

FIG. 7 shows a control interface of a system according to an embodiment. The control or operation interface is provided as a user-friendly touch screen interface. In the central area of the control interface, the plan of the space room is shown, in which a good overview of a space to be illuminated is illustrated. On the left side, some control buttons with pictograms for controlling the interface are provided. On the right side, a menu with settings is provided. The control interface may be configured as a part of a server or a part of a terminal device. In some embodiments, a wearable smart device is used as a terminal device for providing a control interface.

Figure 8:
FIG. 8 shows an example of an outputted rendering simulation.

FIG. 8 shows an example of an outputted rendering simulation. FIG. 8 specifically shows the results of simulation performed for a workspace with downlights arranged above a group of desks. As can be seen from the example in FIG. 8, the simulation provides a very realistic picture of workspace lighting.

FIG. 9 shows a flowchart of a method for designing HCL according to an embodiment. The method 10 is based on an algorithm of light and space, and starts with step 20.

In step 25, a user provides a floor plan and allocates functions to the spaces within the floor plan. In step 25 or in a separate step, the user further provides use-related information 26. The use-related information 26 may specifically include the age of user, dynamic change, maintenance coefficient, and the like. The use-related information may further include use condition, use target, and target physiological characteristics of a user group of a target group. By considering the target group related information, HCL can be specifically customized for the target user group. Specifically, the target group related information may include the age of the user. Because age can have a substantial impact on the circadian rhythm of individuals, personalized HCL can be provided to the target group with the age of the user considered.

In step 30, looking up in a database of historical lighting solutions based on the floor plan to find solution that matches the space. Step 30 may further include searching in historical HCL design solutions and empirical data 31.

In step 35, extracting a layout method from the lighting solution in the historical lighting solution that has been matched with the space of the floor plan.

In Step 40, searching for lighting devices available for the space and layout. In step 40 or in a separate step, optical performance requirements 41, such as color rendering index (CRI), uniform glare rating (UGR), flicker, dynamic change, etc., may be included.

In Step 45, simulating the installation of lighting devices into the space based on the layout. Step 45 may require MDER data 46 as an input for performing the simulation.

In step 50, calculating lighting data. The calculating of lighting data may include MEDI correction 51 and/or room factor correction. Specifically, the MEDI data 51 can be retrieved from the lighting standard database.

In step 55, checking whether the calculated lighting data meets the applicable lighting standards is performed.

If the result of the checking in step 55 shows that the calculated lighting data meets the applicable lighting standards, then an HCL lighting plan is generated in step 60, before the end of the process in step 65.

The method 10 may further include step 70, that is, modifying the search criteria. Specifically, modifying the search conditions and package of devices, and repeating the step of searching for lighting devices and all subsequent steps of the method. The steps 45, 50, 55 and 70 may be repeated until the calculated lighting data meets the applicable standards.

Figure 10:
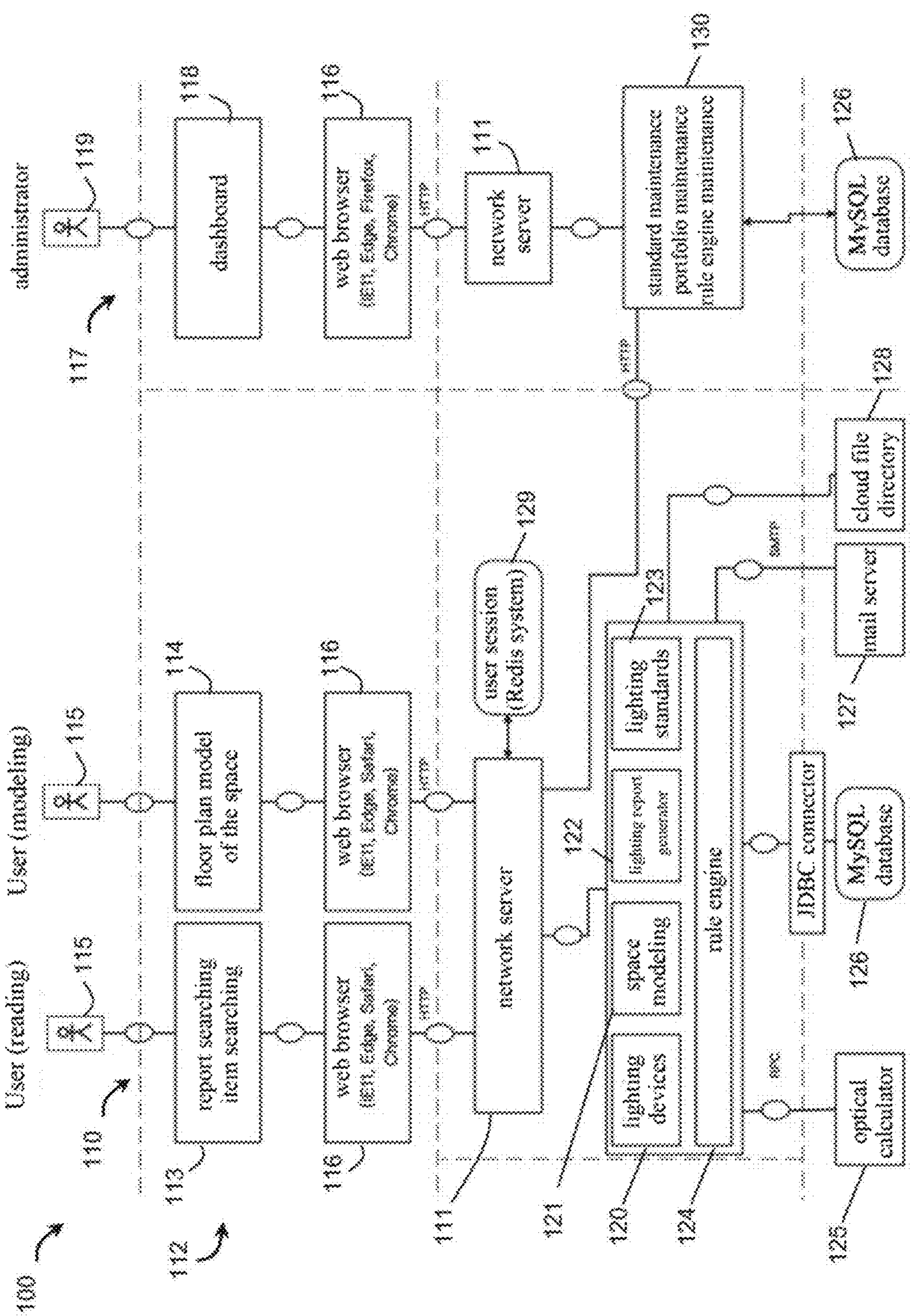
FIG. 10 shows a system structure according to an embodiment.

FIG. 10 shows a schematic diagram of a system according to an embodiment.

The system 100 includes a user area 110. The user area 110 includes a server 111 as a network server, and a user interface 112 for communicating with the server 111. The user interface 112 includes a reading interface 113 and a modeling interface 114. Through the reading interface 113, the user 115 can read the search report and the item search. Through the modeling interface 114, the user 115 can create a floor plan model of the space to be illuminated. The reading interface 113 and the modeling interface 114 are connected to the network server 111 through a web browser 116.

The system 100 further includes an administrator area 117. The administrator area 117 includes an administrator interface 118. The administrator interface 118 may include a dashboard of the administrator 119. The administrator interface 118 is connected to the server 111 through the web browser 116. The network server 111 of the administrator area 117 is connected to the network server 111 of the user area 110 through a network protocol. In some embodiments, both the user 115 and the administrator 119 use the same server 111.

In the embodiment of FIG. 10, the administrator area 110 further includes a lighting device database 120, a space modeling unit 121 or a scene generation module, a lighting report generator 122 or a modeling and output module, a lighting standard database 123 and a rule engine 124. The server 111 of the user area 110 can be connected to an optics calculator 125 through a remote procedure call (RPC) connection and connected to a MySQL database 126 through a Java Database Connectivity (JDBC) connection. In addition, the server 111 can be connected to a mail server 127 and a cloud file directory 128 through the Simple Mail Transfer Protocol (SMTP). In the embodiment of FIG. 10, the user area 110 includes a user session database 129 connected to the server 111.

The administrator area 117 includes a maintenance module 130, which is connected to the MySQL database 126 and is configured to ensure the maintenances of standards, portfolio and the rule engine.

By means of the system 100, the method 10 according to the first aspect can be performed. Therefore, after the space and use/user information are entered into the system, a general lighting plan with HCL enabled can be completed with one click. This makes the system and method particularly attractive to ordinary users and lighting designers.

In addition, it is not necessary to know the professional lighting design to obtain a qualified HCL plan. When designing an HCL, the method further considers the social division of space and user images.

In addition, the method is not limited to luminaires. In fact, a complete set of HCL lighting solution including controller, sensor, control group, circuit schematics and preset scene can be generated by only one click.

Although at least one exemplary embodiment has been given in the above detailed description, it should be understood that there are numerous variations. It should also be understood that one or more exemplary embodiments are merely examples and are not intended to limit the scope, applicability or configuration of the present disclosure in any way. Rather, the foregoing detailed description will provide those skilled in the art with a convenient road map for implementing one or more exemplary embodiments.

LIST OF REFERENCE NUMBERS

1 Luminaires
2 Sensor
3 Controller
4 Switch
5 Network
20 Start of Method
26 Use Related Information

30 Method Step
31 Historical HCL Design solutions and empirical data
35 Method Step
40 Method Step
41 Optical Performance Requirements
45 Method Step
46 MDER Data
50 Method Step
51 MEDI Correction
55 Method Step
60 Method Step
65 End of Method
70 Method Step
100 System
110 User Area
111 Server
112 User Interface
113 Reading Interface
114 Modeling Interface
115 User
116 Web Browser
117 Administrator area
118 Administrator Interface
119 Administrator
120 Lighting Device Database
121 Space Modeling Unit
122 Lighting Report Generator
123 Lighting Standard Database
124 Rule Engine
125 Optics Calculator
126 MySQL database
127 Mail Server
128 Cloud File Directory
129 User Session Database
130 Maintenance Module

What is claimed is:

1. A method for designing human-centric lighting (HCL) for illuminating a space, the method comprising:
- providing use-related information to a floor plan of the space;
- performing a search in a database of historical lighting solutions based on the floor plan to find a lighting solution matching the space;
- extracting a layout method from the lighting solution matching the space;
- performing a search in a lighting device database;
- selecting a lighting device available for the space and layout from the lighting device database;
- simulating an installation of the lighting device into the space based on the layout;
- calculating lighting data;
- performing a search in a lighting standard database;
- checking whether the calculated lighting data meets an applicable lighting standard; and
- generating an HCL lighting plan if a result of the checking shows a conformity of the calculated lighting data to the applicable lighting standard;
- wherein the database of historical lighting solutions comprises historical HCL design solutions and empirical data.

2. The method according to claim 1, wherein the use-related information comprises information about a function designated to the space within the floor plan.

3. The method according to claim 1, wherein the use-related information includes target group-related information.

4. A system configured to perform the method according to claim 1.

5. The system according to claim 4, wherein the system comprises at least one of:
- a server; and
- an interface configured for receiving input from a user.

6. A method for designing human-centric lighting (HCL) for illuminating a space, the method comprising:
- providing use-related information to a floor plan of the space;
- performing a search in a database of historical lighting solutions based on the floor plan to find a lighting solution matching the space;
- extracting a layout method from the lighting solution matching the space;
- performing a search in a lighting device database;
- selecting a lighting device available for the space and layout from the lighting device database;
- simulating an installation of the lighting device into the space based on the layout;
- calculating lighting data;
- performing a search in a lighting standard database;
- checking whether the calculated lighting data meets an applicable lighting standard; and
- generating an HCL lighting plan if a result of the checking shows a conformity of the calculated lighting data to the applicable lighting standard;
- modifying one or more search criteria; and
- repeating each of the following from the method until the calculated lighting data meets the applicable lighting standard:
  - performing the search in the lighting device database;
  - selecting the lighting device available for the space and layout from the lighting device database;
  - simulating the installation of the lighting device into the space based on the layout;
  - calculating the lighting data;
  - performing the search in the lighting standard database;
  - checking whether the calculated lighting data meets the applicable lighting standard; and
  - generating the HCL lighting plan if the result of the checking shows the conformity of the calculated lighting data to the applicable lighting standard.

7. The method according to claim 6, wherein the use-related information comprises information about a function designated to the space within the floor plan.

8. The method according to claim 6, wherein the use-related information includes target group-related information.

9. A system configured to perform the method according to claim 6.

10. The system according to claim 9, wherein the system comprises at least one of:
- a server; and
- an interface configured for receiving input from a user.

11. A method for designing human-centric lighting (HCL) for illuminating a space, the method comprising:
- providing use-related information to a floor plan of the space;
- performing a search in a database of historical lighting solutions based on the floor plan to find a lighting solution matching the space;
- extracting a layout method from the lighting solution matching the space;
- performing a search in a lighting device database;
- selecting a lighting device available for the space and layout from the lighting device database;

simulating an installation of the lighting device into the space based on the layout;

calculating lighting data;

performing a search in a lighting standard database;

checking whether the calculated lighting data meets an applicable lighting standard;

generating an HCL lighting plan if a result of the checking shows a conformity of the calculated lighting data to the applicable lighting standard; and at least one of:

(a) providing at least one of dynamic change data and maintenance coefficient data and performing the search in the database of historical lighting solutions based, at least in part, on the at least one of the dynamic change data and the maintenance coefficient data;

(b) providing data about at least one of color rendering index (CRI), uniform glare rating (UGR), flicker, and dynamic requirement change and selecting the lighting device based, at least in part, on the data about the at least one of CRI, UGR, flicker, and dynamic requirement change; and (c) providing melanopic daylight efficacy ratio (MDER) data and selecting the lighting device based, at least in part, on the MDER data.

12. The method according to claim 11, wherein the use-related information comprises information about a function designated to the space within the floor plan.

13. The method according to claim 11, wherein the use-related information includes target group-related information.

14. A system configured to perform the method according to claim 11.

15. The system according to claim 14, wherein the system comprises at least one of:

a server; and an interface configured for receiving input from a user.

* * * * *